US011002834B2

(12) United States Patent
Kaestner et al.

(10) Patent No.: US 11,002,834 B2
(45) Date of Patent: May 11, 2021

(54) LIDAR SCANNING DEVICE AND LIDAR SCANNING DEVICE SYSTEM

(71) Applicant: Robert Bosch GmbH, Stuttgart (DE)

(72) Inventors: Frank Kaestner, Bietigheim-Bissingen (DE); Hans-Jochen Schwarz, Stuttgart (DE); Joern Ostrinsky, Ditzingen (DE); Klaus Stoppel, Mundelsheim (DE); Mustafa Kamil, Leonberg (DE); Siegwart Bogatscher, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 16/064,569

(22) PCT Filed: Oct. 26, 2016

(86) PCT No.: PCT/EP2016/075814
§ 371 (c)(1),
(2) Date: Jun. 21, 2018

(87) PCT Pub. No.: WO2017/108236
PCT Pub. Date: Jun. 29, 2017

(65) Prior Publication Data
US 2019/0004153 A1    Jan. 3, 2019

(30) Foreign Application Priority Data

Dec. 22, 2015   (DE) .......................... 102015226460.2

(51) Int. Cl.
*G01S 7/48* (2006.01)
*G01S 7/481* (2006.01)
(Continued)

(52) U.S. Cl.
CPC ............ *G01S 7/4816* (2013.01); *G01S 17/42* (2013.01); *G01S 17/931* (2020.01)

(58) Field of Classification Search
CPC .... G01S 7/4816; G01S 7/4814; G01S 17/931; G01S 17/42
See application file for complete search history.

(56) References Cited

U.S. PATENT DOCUMENTS

2012/0069342 A1* 3/2012 Dalgleish ............... G01N 21/47
356/445
2013/0044309 A1* 2/2013 Dakin ................... G01S 7/4814
356/4.09
(Continued)

FOREIGN PATENT DOCUMENTS

CN   102253394 A   11/2011
DE   102013205589 A1   10/2014
(Continued)

OTHER PUBLICATIONS

International Search Report for PCT/EP2016/075814, dated Jan. 27, 2017.

*Primary Examiner* — Luke D Ratcliffe
(74) *Attorney, Agent, or Firm* — Norton Rose Fulbright US LLP; Gerard Messina

(57) ABSTRACT

A lidar scanning device for use in a motor vehicle includes a light source for emitting light onto an object; a light detector for receiving light that was reflected by the object; and multiple optical imaging elements in the optical path between the object and the light detector.

11 Claims, 3 Drawing Sheets

(51) Int. Cl.
*G01S 17/42* (2006.01)
*G01S 17/931* (2020.01)

(56) References Cited

U.S. PATENT DOCUMENTS

| | | | | |
|---|---|---|---|---|
| 2015/0146189 A1* | 5/2015 | Kim | ............... | G01S 7/4816 |
| | | | | 356/4.01 |
| 2016/0054446 A1* | 2/2016 | Winter | ............... | G02B 7/16 |
| | | | | 356/4.01 |

FOREIGN PATENT DOCUMENTS

| | | |
|---|---|---|
| DE | 102014217209 A1 | 5/2015 |
| JP | H06242224 A | 9/1994 |
| JP | 2005331273 A | 12/2005 |
| JP | 2009267314 A | 11/2009 |
| JP | 2010133828 A | 6/2010 |

\* cited by examiner

LIDAR SCANNING DEVICE AND LIDAR SCANNING DEVICE SYSTEM

FIELD OF THE INVENTION

The present invention relates to a lidar scanning device. The present invention relates particularly to a lidar scanning device for use on a motor vehicle.

BACKGROUND INFORMATION

A lidar scanning device comprises a light source and a light detector.

The light source emits light within a predetermined monitoring region and the light detector receives emitted light that was reflected on an object in the monitoring region. On the basis of the detected reflected light, it is possible to determine for example an extension and/or a distance of the object.

Different monitoring regions are advantageous for different purposes. If the motor vehicle is driving on an expressway, for example, then it is possible to detect a preceding motor vehicle in a monitoring region that has a small spread angle and a great range. If the motor vehicle is traveling slowly on the other hand, then it is possible to improve the scan of a close-up region using a large spread angle and a small range.

Normally an optical imaging element is provided in the optical path between the object and the light detector, which determines the monitoring region. For this purpose, the optical imaging element is permanently selected so that a lidar scanning device is usually permanently assigned to a purpose or a group of similar applications.

SUMMARY OF THE INVENTION

The present invention has the objective of providing an improved lidar scanning device and lidar scanning device system. The present invention achieves this objective by way of the subject matters of the independent claims. Dependent claims represent specific embodiments.

A lidar scanning device for use in a motor vehicle comprises a light source for emitting light onto an object; a light detector for receiving light that was reflected by the object; and multiple optical imaging elements in the optical path between the object and the light detector.

By using not only one, but several imaging elements, it is possible to use the same lidar scanning device for different purposes. It is possible, for example, for different driver assistance systems on board the motor vehicle to access the lidar scanning device.

An optical imaging element may comprise a taper optics, a refractive element or a diffractive element. A taper optics is usually formed from a large number of light-conducting fibers, which project light from an input face onto an output face. The fibers may be monomode and are able to be bundled in a tight manner so as to form a solid block. A refractive element is based on the refraction of light and may comprise for example a lens or a prism. A diffractive element is based on the diffraction of light and may operate with the aid of a microstructure for example. The present invention makes it possible to combine similar or different optical imaging elements with one another.

It particularly may be that the optical imaging elements have different monitoring regions. This allows for the improved ability of the lidar scanning system being able to be used for different purposes.

In one variant, the monitoring regions differ in a spread angle or in a range. In another variant, the monitoring regions differ in an orientation of their boundaries. In other words, the monitoring regions may differ with respect to their spread angle or their range and/or with respect to their direction relative to an orientation of the motor vehicle. The variations may be combined with one another such that for example a first monitoring region is directed in the driving direction in front and has a narrow spread angle, while a second monitoring region is oriented laterally and has a large spread angle. Thus is is possible, for example, that both an anti-collision assistant and a parking assistant are able to use the lidar scanning device with a respectively associated monitoring region.

In a specific embodiment, the imaging elements project onto different regions of the light detector. This makes it possible to utilize the monitoring regions also concurrently, that is, simultaneously.

In another specific embodiment, the areas of the light detector, onto which the imaging elements project, overlap, and a controllable diaphragm may be provided for blocking one of the monitoring regions. The diaphragm may be controlled in particular so as to block all except one of the monitoring regions. For this purpose, it is possible to provide two individually controllable diaphragms or one common diaphragm. The common diaphragm may comprise in particular a simple pinhole diaphragm, which may be shifted in such a way that its pinhole lies in the specific optical path whose associated monitoring region is to be utilized. This makes it possible to use different monitoring regions in succession, which respectively are able to utilize the entire light detector.

In yet another specific embodiment, an optical band-pass filter is respectively provided in the optical paths of the imaging elements, the bandwidths and/or center wavelengths of the band-pass filters differing from one another. The bandwidth and/or the center wavelength of a band-pass filter may be adapted to an associated monitoring region. In particular, a spread angle or a range may be adapted. The smaller the spread angle, the smaller may be the bandwidth of the band-pass filter so that an improved signal-to-noise ratio (SNR) may be obtained.

A lidar scanning device comprises a light source for emitting light onto an object; a light detector for receiving light that was reflected by the object; and multiple optical imaging elements, of which one is able to be positioned in the optical path between the object and the light detector.

The optical imaging element may be selected as a function of a planned use of the lidar scanning device, which results from the insertion of the imaging element. It particularly may be that multiple optical imaging elements may be situated in the optical path, as described in more detail above.

Advantageously, a range and/or a spread angle of a monitoring region of the lidar scanning device may be discretely varied by a corresponding selection of a suitable optical imaging element. In particular, it is possible discretely to adapt the range within a predetermined spread angle. It is possible to adapt a sensor housing in an improved manner to an inserted optical imaging element. A monitoring region may be expanded by adding another optical imaging element, in particular a taper optics, a refractive element or a diffractive element. It is possible to replace a light detector array comprising a plurality of discrete light detectors by discrete individual detectors. An optical imaging element may be assigned to each individual detector. The discrete individual detectors may be more cost-effective and/or more robust. It is possible to select the optical imaging elements in such a way that the monitoring regions overlap one another so that a scanning process may be rendered more robust with regard to dirt or other interferences for example. Furthermore, it is possible to define a region in that multiple monitoring regions overlap one another so that redundant scanning is possible in this particular region of interest (ROI). This makes it possible to increase the ASIL capability of the lidar scanning device.

The present invention will now be described in greater detail with reference to the accompanying figures.

DETAILED DESCRIPTION

Figure 1:
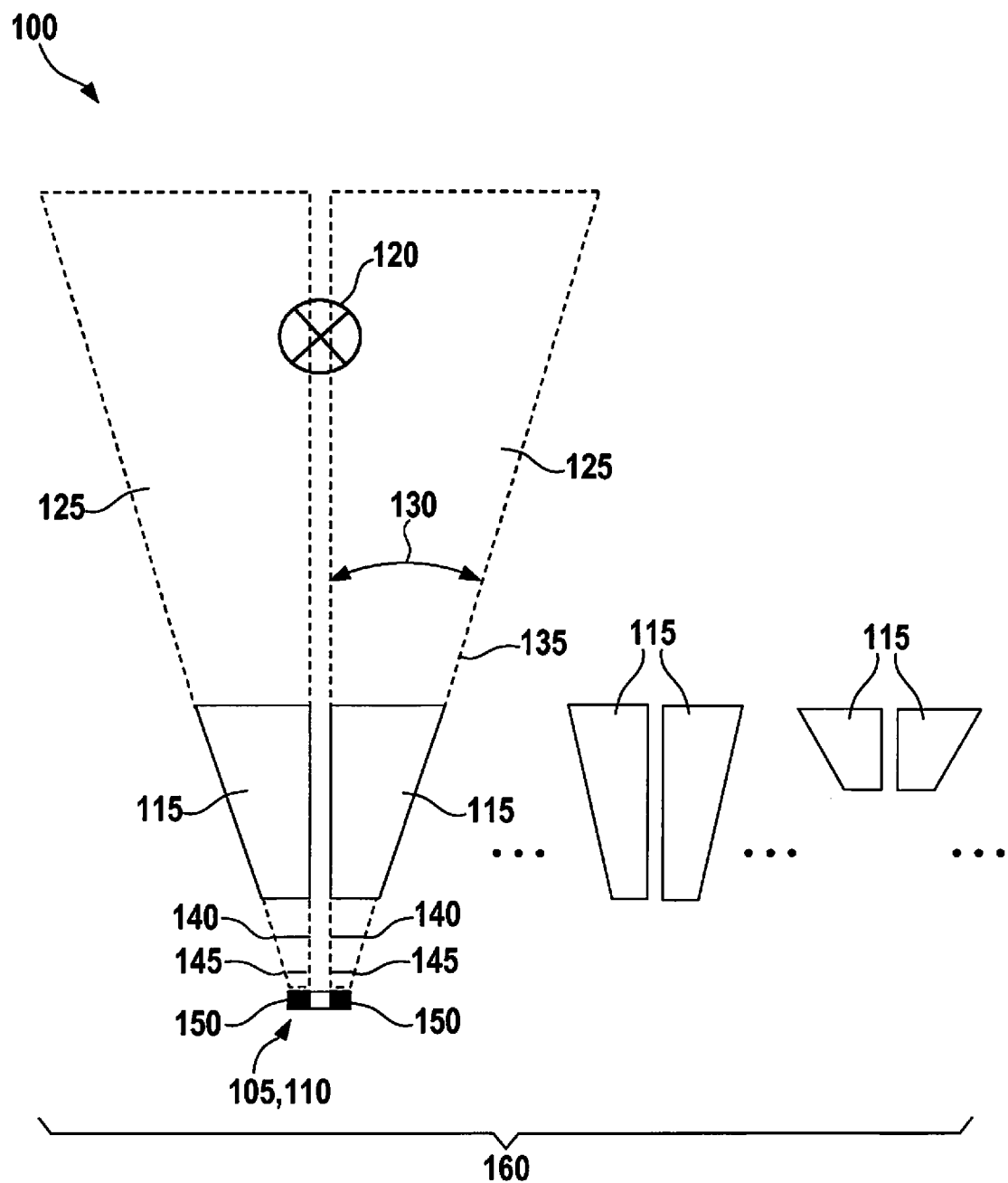
FIG. 1 shows a lidar scanning device for use on a motor vehicle.

FIG. 1 shows a lidar scanning device 100, in particular for use on a motor vehicle. Scanning device 100 comprises a light source 105 and a light detector 110 as well as multiple optical imaging elements 115. Scanning device 100 is configured optically to scan an object 120. For this purpose, light source 105 emits light which may be reflected on object 120 and cast onto light detector 110. In one specific embodiment, light source 105 and light detector 110 are configured to be integrated with each other so that they largely share the same optical path. Light source 105 may comprise a laser whose light is able to be guided in rows or in rows and columns over a predetermined region. Light detector 110 comprises either a discrete element or a one-dimensional or two-dimensional array of discrete sensor elements. Optical imaging element 115 is situated in the optical path between object 120 and light detector 110 and is configured to focus or expand light passing through it in a predetermined manner. Optical imaging element 115 may comprise in particular a taper optics, a refractive element, a diffractive element or a combination of these.

A monitoring region 125, from which light may fall through imaging element 115 onto light detector 110 is usually determined mainly by the optical properties of the imaging element 115. In particular, imaging element 115 is able to define a spread angle 130 or an orientation of a boundary 135 of spread angle 130.

The present invention provides for at least two optical imaging elements 115 to be situated simultaneously in the optical path between object 120 and light detector 110. As may be seen from the representation in FIG. 1, each imaging element 115 may have an associated monitoring region 125, the entire monitoring region 125 of lidar scanning device 100 resulting from the combination of both monitoring regions 125.

Optionally, a diaphragm 140 and/or a band-pass filter 145 are provided in the optical path between object 120 and light detector 110. A separate band-pass filter 145 may be assigned to each imaging element 115. It is also possible to use assigned diaphragms 140 or a common diaphragm for both imaging elements 115. In one specific embodiment, diaphragm 140 comprises a simple pinhole diaphragm, which is configured to allow for the optical path between only one of the optical imaging elements 115 and light detector 110 and to block the other optical path. In yet another specific embodiment, it is possible for diaphragm 140 to be made up of one or multiple iris diaphragms together with the pinhole diaphragm.

Monitoring regions 125 may differ from one another with respect to their orientation, their spread angle 130 and/or their range. Monitoring regions 125 may overlap one another or may be disjunctive with respect to one another. The orientation of a monitoring region may be given by a bisector of spread angle 130 that extends between boundaries 135. In different specific embodiment, monitoring regions 125 may be distinct from one another or may overlap one another. In other specific embodiments, monitoring regions 125 may also be identical with one another or one of monitoring regions 125 may be a part of the other monitoring regions 125.

Each optical imaging element 115 is configured to project light onto a predetermined associated detection region 150 of light detector 110. Regardless of the relative position of monitoring regions 125, detection regions 150 may overlap one another, may be identical to one another, may be disjunctive, or a detection region 150 may form a part of the other detection region 150. In one specific embodiment, both detection regions 150 are on the same light detector 110, while in another specific embodiment two discrete light detectors 110 are provided, of which each has its own detection region 150.

The different possibilities of adapting the monitoring regions 125 and the detection regions 150 to one another make it possible to produce a great number of different specific embodiments with otherwise identical components by respectively selecting suitable optical imaging elements 115.

A lidar scanning device system 160 comprises multiple optical imaging elements 115, of which at least one, and which may, however, be at least two, is/are used in order to form the lidar scanning device 100 described above. In the manner of a construction kit, system 160 makes it possible to build a lidar scanning device 100 that may be specifically adapted to multiple different purposes. In another specific embodiment, three or more optical imaging elements 115 are provided in lidar scanning device 100, the above explanations being respectively applicable.

Figure 2:
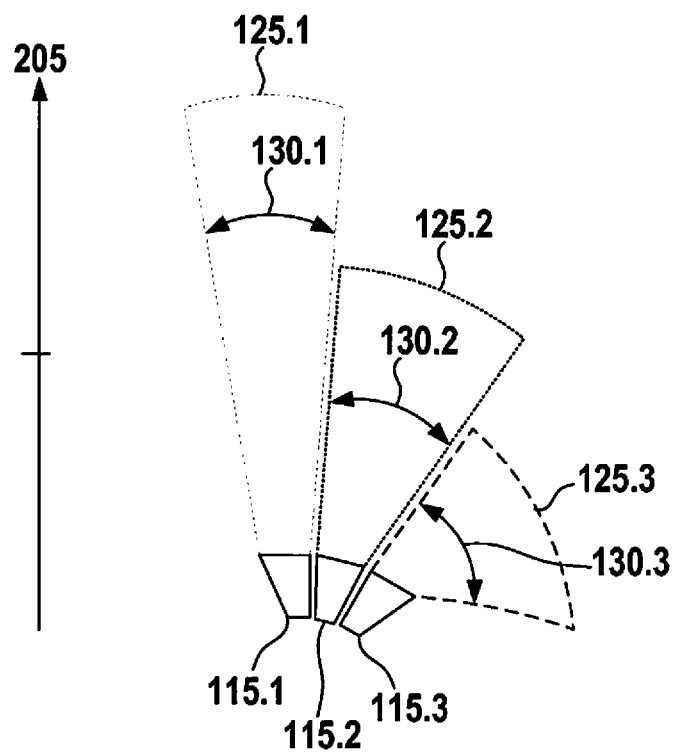
FIG. 2 shows different monitoring regions of a lidar scanning device as shown in FIG. 1.
Figure 2:
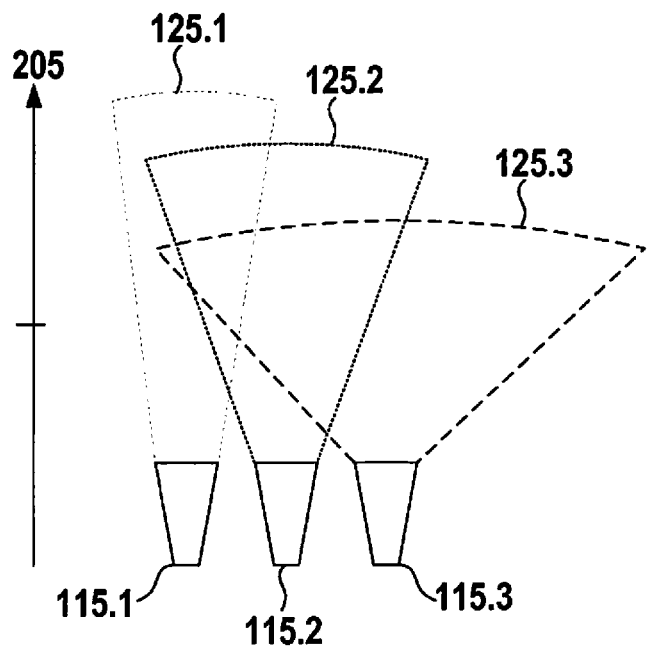

FIG. 2 shows different exemplary monitoring regions 125 of a lidar scanning device 100 as shown in FIG. 1. An upper illustration shows a top view and a lower illustration shows a lateral view of monitoring regions 125.

A first monitoring region 125.1, which is assigned to a first optical imaging element 115.1, has a small first spread angle 130.1. The range is relatively large and first monitoring region 125.1 is oriented in a horizontally and vertically symmetrical manner with respect to a direction of travel 205.

A second monitoring region 125.2 is assigned to a second optical imaging element 115.2. A second spread angle 130.2 is smaller than first spread angle 130.1 and the orientation of second monitoring region 125.2 encloses in the horizontal direction an angle with the direction of travel 205, while second monitoring region 125.2 runs in the vertical direction parallel to the direction of travel 205.

A third monitoring region 125.3 is assigned to a third optical imaging element 115.3. An associated third spread angle 130.3 is greater than second spread angle 130.2, and a horizontal orientation of third monitoring region 125.3 encloses in the horizontal direction a greater angle with the direction of travel 205 than second monitoring region 125.2.

In the vertical direction, third monitoring region 125.3 is oriented parallel with respect to the direction of travel 205.

Imaging elements 115.1, 115.2 and 115.3 may be used simultaneously or successively in order to scan monitoring regions 125.1, 125.2 or 125.3. All imaging elements 115 may be respectively part of the same lidar scanning device 100 so that it is possible to perform different scanning processes using the same scanning device 100.

Figure 3:
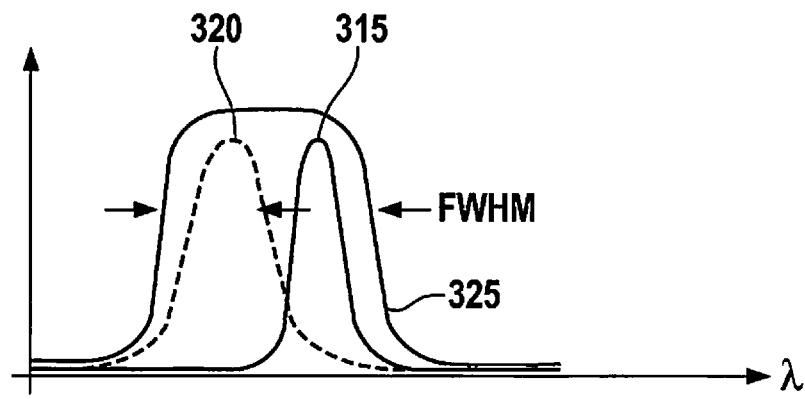
FIG. 3 shows diagrams of different band-pass filters for use on the lidar scanning device from FIG. 1.
Figure 3:
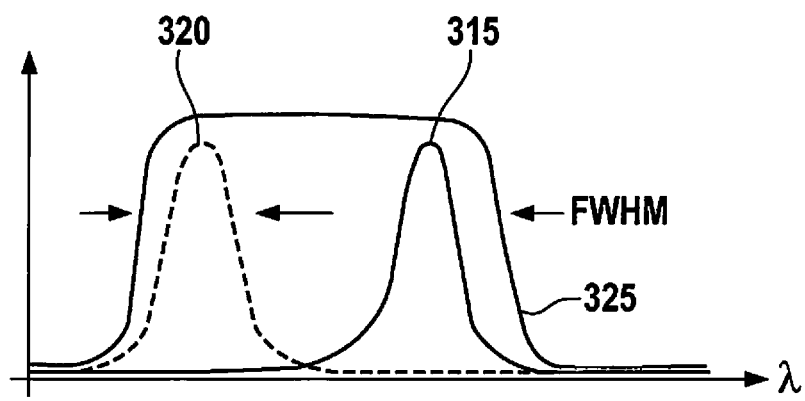

FIG. 3 shows diagrams of different band-pass filters 145 for use on the lidar scanning device 100 from FIG. 1. A first diagram 305 is shown in the upper illustration, and a second diagram 310 is shown in the lower illustration. First diagram 305 is associated with a first band-pass filter 145, which is associated with a first monitoring region 125, while second diagram 310 is associated with a second band-pass filter 145, which is associated with a second monitoring region 125 (cf. FIG. 1). In one specific embodiment, band-pass filters 145 may be configured so that the respectively associated optical imaging elements 115 are integrated.

The two diagrams 305, 310 show a wavelength in the horizontal direction and a transmittance, that is, a permeability of the respective band-pass filter 145, in the vertical direction.

In each diagram 305, 310, a first transmittance curve 315 is plotted as a solid line, a second transmittance curve 320 is plotted as a dashed line, and each diagram 305, 310 also shows an envelope curve 325. It is assumed that band-pass filter 145 of first diagram 305 is associated with a monitoring region 125 having a small spread angle 130 and that second diagram 310 is associated with a monitoring region 125 having a greater spread angle 130. First transmittance curve 315 respectively indicates the light passing through band-pass filter 145 when it comes in from the direction of the bisector of spread angle 130. Second transmittance curve 320 analogously indicates the light passing through band-pass filter 145 from a direction near one of boundaries 135. Envelope curve 325 indicates the respective transmittance range of the two band-pass filters 145. It may be seen that it is possible to use a narrower envelope curve 325 in first diagram 305 than in second diagram 310.

In other words, envelope curve 325 of band-pass filter 145 may be selected as a function of the spread angle 130 of the respectively associated monitoring region 125. Thus the bandwidth, which corresponds in the representation to the width of the envelope curve 125 at half height (full width at half maximum, FWHM), may be kept narrow in adapted fashion. An improved protection against interfering light, which may come from the sun for example or another light source, may thereby be achieved.

What is claimed is:

1. A lidar scanning device for a motor vehicle, comprising:
a light source to emit light onto an object;
a light detector to receive light that is reflected by the object;
multiple optical imaging elements in an optical path between the object and the light detector; and
an optical band-pass filter in the optical paths of the imaging elements, wherein bandwidths and/or center wavelengths of the band-pass filters differ from one another;
wherein an envelope curve of the band-pass filter is selected as a function of a spread angle of an associated monitoring region, so that a bandwidth, which corresponds to a full width (FW) of the envelope curve at half height or half maximum (HM) (FWHM), is controlled in an adapted manner to protect against interfering light, and
wherein the optical imaging elements includes taper optics.

2. The lidar scanning device of claim 1, wherein an optical imaging element includes taper optics, a refractive element or a diffractive element.

3. The lidar scanning device of claim 1, wherein the optical imaging elements have different monitoring regions.

4. The lidar scanning device of claim 3, wherein the monitoring regions differ from one another in a spread angle or a range.

5. The lidar scanning device of claim 3, wherein the monitoring regions differ from one another in an orientation of their boundaries.

6. The lidar scanning device of claim 1, wherein the imaging elements project onto different regions of the light detector.

7. The lidar scanning device of claim 1, wherein regions of the light detector, onto which the imaging elements project, overlap one another, and wherein there is a controllable diaphragm to block one of the monitoring regions.

8. The lidar scanning device of claim 1, wherein there is one optical band-pass filter in the optical paths of the imaging elements and bandwidths and/or center wavelengths of the band-pass filters differ from one another.

9. A lidar scanning device system for a motor vehicle, comprising:
a light source to emit light onto an object;
a light detector to receive light that is reflected by the object; and
multiple optical imaging elements, one of which is positionable in an optical path between the object and the light detector; and
an optical band-pass filter in the optical paths of the imaging elements, wherein bandwidths and/or center wavelengths of the band-pass filters differ from one another;
wherein an envelope curve of the band-pass filter is selected as a function of a spread angle of an associated monitoring region, so that a bandwidth, which corresponds to a full width (FW) of the envelope curve at half height or half maximum (HM) (FWHM), is controlled in an adapted manner to protect against interfering light, and
wherein the optical imaging elements includes taper optics.

10. The lidar scanning device system of claim 9, wherein simultaneously multiple optical imaging elements are positionable in the optical path.

11. The lidar scanning device system of claim 9, wherein regions of the light detector, onto which the imaging elements project, overlap one another, further comprising:
a controllable diaphragm to block one of the monitoring regions.

* * * * *